United States Patent
Seyfi et al.

(10) Patent No.: US 11,966,275 B2
(45) Date of Patent: Apr. 23, 2024

(54) FAST AND ACCURATE ANOMALY DETECTION EXPLANATIONS WITH FORWARD-BACKWARD FEATURE IMPORTANCE

(71) Applicant: Oracle International Corporation, Redwood Shores, CA (US)

(72) Inventors: Ali Seyfi, Vancouver (CA); Yasha Pushak, Vancouver (CA); Hesam Fathi Moghadam, Sunnyvale, CA (US); Sungpack Hong, Palo Alto, CA (US); Hassan Chafi, San Mateo, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/992,743

(22) Filed: Nov. 22, 2022

(65) Prior Publication Data

US 2023/0376366 A1  Nov. 23, 2023

Related U.S. Application Data

(60) Provisional application No. 63/344,877, filed on May 23, 2022.

(51) Int. Cl.
*G06F 11/00* (2006.01)
*G06N 20/00* (2019.01)

(52) U.S. Cl.
CPC ........... *G06F 11/006* (2013.01); *G06N 20/00* (2019.01); *G06F 2201/82* (2013.01)

(58) Field of Classification Search
None
See application file for complete search history.

(56) References Cited

U.S. PATENT DOCUMENTS 10,880,763 B1 * 12/2020 Vela ............... H04W 24/02
11,556,742 B2 * 1/2023 Levanony ........... G16H 30/40
(Continued)

FOREIGN PATENT DOCUMENTS

WO   WO-2021249858 A1 * 12/2021   ........... G16H 10/00

OTHER PUBLICATIONS

Chen, J. et al., Machine Learning-based Anomaly Detection of Ganglia Monitoring Data in HEP Data Center, 2020, EPJ Web of Conferences 245, 07061 pp. 1-8.*
(Continued)

*Primary Examiner* — Mujtaba M Chaudry
(74) *Attorney, Agent, or Firm* — Hickman Becker Bingham Ledesma LLP; Brian Miller

(57) ABSTRACT

The present invention relates to machine learning (ML) explainability (MLX). Herein are local explanation techniques for black box ML models based on coalitions of features in a dataset. In an embodiment, a computer receives a request to generate a local explanation of which coalitions of features caused an anomaly detector to detect an anomaly. During unsupervised generation of a new coalition, a first feature is randomly selected from features in a dataset. Which additional features in the dataset can join the coalition, because they have mutual information with the first feature that exceeds a threshold, is detected. For each feature that is not in the coalition, values of the feature are permuted in imperfect copies of original tuples in the dataset. An average anomaly score of the imperfect copies is measured. Based on the average anomaly score of the imperfect copies, a local explanation is generated that references (e.g. defines) the coalition.

20 Claims, 6 Drawing Sheets

(56) References Cited

U.S. PATENT DOCUMENTS

2022/0070196 A1* 3/2022 Sarkar .................. G06N 5/02
2022/0335255 A1 10/2022 Zohrevand et al.
2022/0366297 A1 11/2022 Pushak et al.

OTHER PUBLICATIONS

Molnar, C., "Ch 5.10, SHAP (Shapley Additive explanations), Interpretable machine learning", dwnloaded May 19, 2021, https://christophm.github.io/interpretable-ml-book/, 2019, 17pgs.

Castro et al., "Improving Polynomial Estimation of the Shapley Value by Stratified Random Sampling with Optimum Allocation", Computers & Operations Research, vol. 82, dated Jun. 2017, 3 pages.

Frye, Christopher, et al., "Shapley-based explainability on the data manifold", arXiv preprint arXiv:2006.01272, Jun. 2020, 13pgs.

Github.com, "Shap Explainers_Permutation", https://github.com/slundberg/shap/blob/7bf645218eb0c40d24b584b05b231cb27babe054/shap/explainers/_permutation.py, dated Apr. 2022, 5 pages.

Hooker, Giles et al., "Please Stop Permuting Features: An Explanation and Alternatives", arXiv preprint arXiv:1905.03151 May 1, 2019, 15pgs.

Laugel et al., "Defining Locality for Surrogates in Post-hoc Interpretablity", ICML Workshop on Human Interpretability in Machine Learning, arXiv:1806.07498 , dated 2018, 7 pages.

Lundberg, 'Permutation explainer-SHAP latest documentation', API Examples, https://shap.readthedocs.io/en/latest/example_notebooks/api_examples/explainers/Permutation.html 2018, revisiond0b4d59f 7pgs.

Lundberg, et al., "Consistent Individualized Feature Attribution for Tree Ensembles", arXiv:1802.03888v, dated 2018, 9 pages.

Aas, Kjersti, et al., "Explaining Individual Predictions When Features Are Dependent: More Accurate Approximations To Shapley Values." arXiv preprint arXiv:1903.10464, Mar. 25, 2019, 25pgs.

Mase, Masayoshi, et al., "Explaining Black Box Decisions By Shapley Cohort Refinement", arXiv preprint arXiv:1911.00467, submitted Nov. 1, 2019; Oct. 2019, 20pgs.

Yakovlev et al., "Oracle Automl: A Fast and Predictive Automl Pipeline", in Proceedings of the VLDB Endowment, vol. 13, No. 12, dated Aug. 2020, 15 pages.

Molnar, C., "Ch 5.5, Permutation Feature Importance, Interpretable machine learning", dwnloaded May 19, 2021, https://christophm.github.io/interpretable-ml-book/, 2019, 10pgs.

Molnar, C., "Ch 5.9, Shapley Values, Interpretable machine learning", dwnloaded May 19, 2021, https://christophm.github.io/interpretable-ml-book/, 2019, 13pgs.

Plumb et al., "Model Agnostic Supervised Local Explanations", 32nd Conference on Neural Information Processing Systems, dated 2018, 10 pages.

Ribeiro et al., ""Why Should I Trust You?": Explaining the Predictions of Any Classifier", Proceedings of the 22nd ACM SIGKDD International Conference on Knowledge Discovery and Data Mining, dated Aug. 2016, 10 pages.

Shapley, Lloyd S., "The Shapley Value", Essays in Honor of Lloyd S. Shapley. edited by Alvin E. Roth. 1988. 338 pgs.

Shapley, Lloyd, "A Value for N-person Games", Contributions to the Theory of Games, vol. 28, doi.org/10.1515/9781400881970-018, dated 1953, 15 pages.

Strobl, C., et al., "Conditional variable importance for random forests", BMC Bioinformatics 2008, 9.307, published Jul. 11, 2008, BioMed Central Ltd., 11pgs.

Strumbelj, et al., "Explaining Prediction Models and Individual Predictions with Feature Contributions", Knowledge and Information Systems , vol. 41, Iss. 3, dated Dec. 2014, 19 pages.

Lundberg, Scott M., et al., "A Unified Approach To Interpreting Model Predictions", Advances in neural information processing systems, 31st Conf on N.I.P.S. 2017, Long Beach, CA. 10pgs.

Williamson, Brian D., et al., "A general framework for inference on algorithm-agnostic variable importance", Cornell Univ. Library, XP91042832, https://arxiv.org/abs/2004.03683v2, Sep. 13, 2021, 69 pages.

Mitchell, Rory, et al., "Sampling Permutations for Shapley Value Estimation", Cornell Univ. Library, XP91145249, https://arxiv.org/abs/2104.12199v2, Feb. 3, 2022, 46 pages.

Jullum, Martin, et al., "groupShapley: Efficient prediction explanation wth Shapley values for feature groups", Cornell Univ. Library, XP81994076, https://arxiv.org/abs/2106.12228v1, Jun. 23, 2021, 23 pages.

Au, Quay, et al., "Grouped Feature Importance and Combined Features Effect Plot", Cornell Univ Library, XP81943563, https://arxiv.org/abs/2104.11688v1, Apr. 23, 2021, 43 pages.

Miroshnikov et al., "Mutual Information-Based Group Explainers with Coalition Structure for Machine Learning Model Explanations", https://doi.org/10.48550/arXiv.2102.10878, 2021, 51pgs.

* cited by examiner

FAST AND ACCURATE ANOMALY DETECTION EXPLANATIONS WITH FORWARD-BACKWARD FEATURE IMPORTANCE

CROSS-REFERENCE TO RELATED APPLICATION; BENEFIT CLAIM

This application claims the benefit of Provisional Appln. 63/344,877, filed May 23, 2022, the entire contents of which is hereby incorporated by reference as if fully set forth herein, under 35 U.S.C. § 119(e).

FIELD OF THE INVENTION

The present invention relates to machine learning (ML) explainability (MLX). Herein are local explanation techniques for black box ML models based on coalitions of features in a dataset.

BACKGROUND

Machine learning (ML) and deep learning are becoming ubiquitous for two main reasons: their ability to solve complex problems in a variety of different domains and growth in performance and efficiency of modern computing resources. However, as the complexity of problems continues to increase, so too does the complexity of the ML models applied to these problems.

Deep learning is a prime example of this trend. Other ML algorithms, such as neural networks, may only contain a few layers of densely connected neurons, whereas deep learning algorithms, such as convolutional neural networks, may contain tens to hundreds of layers of neurons performing very different operations. Increasing the depth of the neural model and heterogeneity of layers provides many benefits. For example, going deeper can increase the capacity of the model, improve the generalization of the model, and provide opportunities for the model to filter out unimportant features, while including layers that perform different operations can greatly improve the performance of the model. However, these optimizations come at the cost of increased complexity and reduced human interpretability of model operation.

Explaining and interpreting the results from complex deep learning models is a challenging task compared to many other ML models. For example, a decision tree may perform binary classification based on N input features. During training, the features that have the largest impact on the class predictions are inserted near the root of the tree, while the features that have less impact on class predictions fall near the leaves of the tree. Feature importance can be directly determined by measuring the distance of a decision node to the root of the decision tree.

Such models are often referred to as being inherently interpretable. However, as the complexity of the model increases (e.g., the number of features or the depth of the decision tree increases), it becomes increasingly challenging to interpret an explanation for a model inference. Similarly, even relatively simple neural networks with a few layers can be challenging to interpret, as multiple layers combine the effects of features and increase the number of operations between the model inputs and outputs. Consequently, there is a requirement for alternative techniques to aid with the interpretation of complex ML and deep learning models.

ML explainability (MLX) is the process of explaining and interpreting ML and deep learning models. MLX can be broadly categorized into local and global explainability:
Local: Explain why an ML model made a specific prediction corresponding to a given sample to answer a question such as why did the ML model make a specific prediction.
Global: Understand the general behavior of the ML model as a whole to answer questions such as how does the ML model work or what did the ML model learn from training data.

An ML model accepts as input an instance such as a feature vector that is based on many features of various datatypes that respectively have many or an infinite amount of possible values. Each feature provides a dimension in a vast multidimensional problem space in which a given multi-featured input is only one point. Even though a global explanation may be based on many input instances, most of the multidimensional problem space is missed by those instances, and the instances are separated from each other by huge spatial gaps. Thus, for explaining a particular inference by an ML model for a particular input that almost always falls within such a spatial gap of unknown behavior of the ML model, a global explanation may have low accuracy. An approach such as Shapley for local explaining requires a number of input instances and output inferences that grows exponentially with the number of features because, by design, Shapley explores relations between features, which is combinatorically intractable. In other words, best of breed local explainers are not scalable and may be computationally overwhelmed by a wide feature vector.

DETAILED DESCRIPTION

Figure 1:
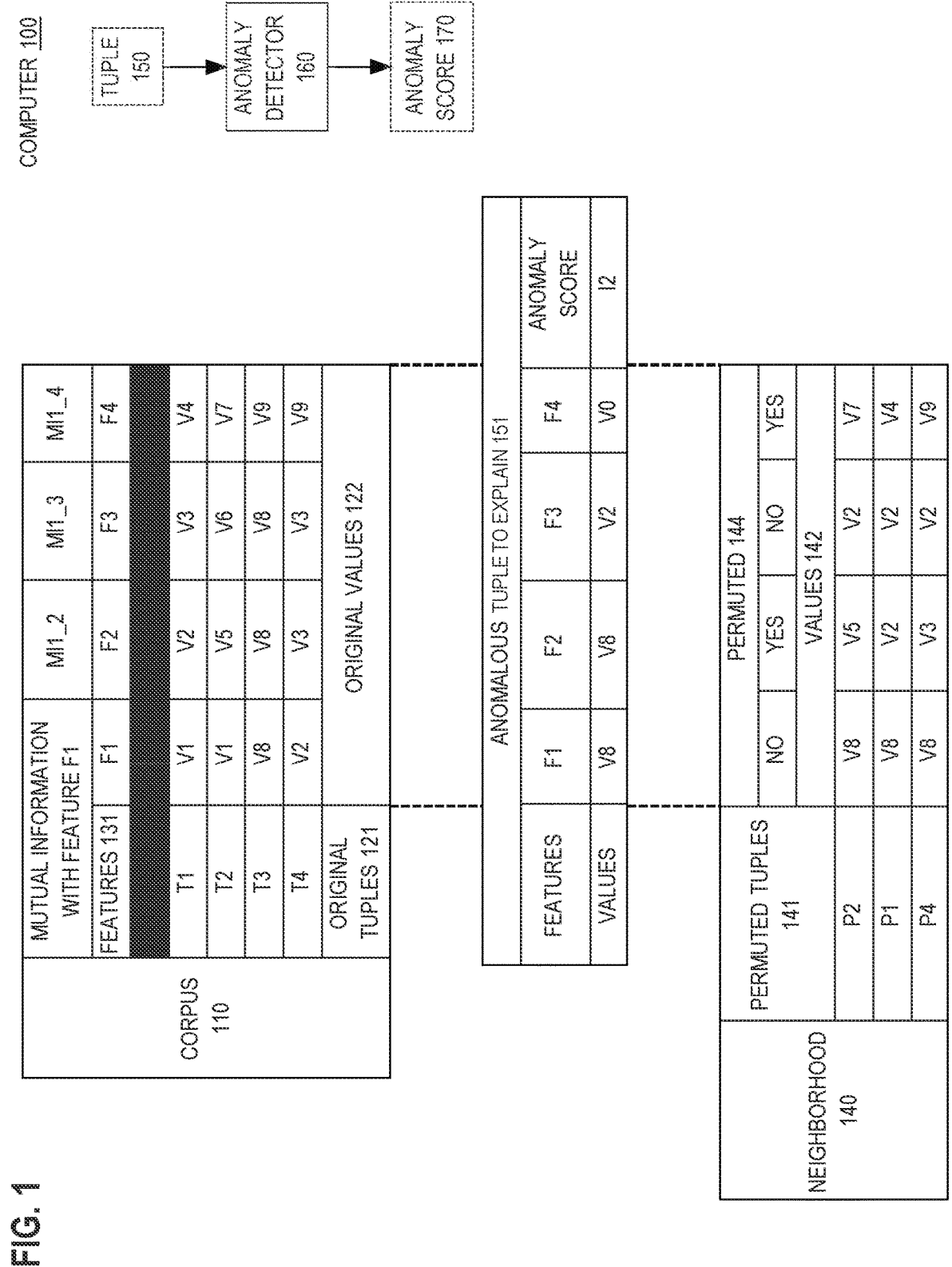
FIG. 1 is a block diagram that depicts an example computer that provides machine learning (ML) explainability (MLX) by using feature coalitions to generate a local explanation of why an anomaly score was inferred by an anomaly detector for an anomalous tuple to explain.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present invention relates to machine learning (ML) explainability (MLX). Herein are local explanation techniques for black box ML models based on coalitions of features in a dataset. To locally explain the behavior of the ML model, perturbation-based MLX techniques evaluate how the predictions of the ML model change when a coalition (i.e. group of cooperating features) is included or excluded as input to the ML model. Herein is a highly-stable, linear-time, perturbation-based, model-agnostic, local feature attribution approach for MLX. This is the first attribution based explanation (ABX) technique that identifies important groups of less important features.

Important local MLX use cases are interactive and do not tolerate latency well. Customer experience (CX) may be at stake. For example, local MLX may be used during a phone conversation such as with a support or sales agent. A localized neighborhood of permuted instances should be quickly generated. Optimizing the above concerns and criteria is expensive with high dimensional datasets having many constituent datatypes.

This approach has at least the following novel features.
Identify groups of candidate features that are likely to work together to create anomalies, while removing the features that are known to be important to avoid allowing them to mask the importance of the remaining features.
Use the pairwise mutual information between the features to guide a heuristic search process (instead of relying on a more simple approach like random sampling or exhaustive search) that selects the coalitions that have a higher chance of being important for the model.
Identify features that are trivially important, and groups of features that interact to create anomalies, which provides more useful information to the user than any existing method.

Unlike Shapley, this approach only requires a linear number of inferences and permuted tuples. That provides acceleration that may be used to increase the density and/or radius of a sampled neighborhood that surrounds the instance to be explained to increase the accuracy of a local explanation. Increased accuracy makes an explaining computer itself more reliable.

As discussed in the Background, Shapley succumbs to intractable features combinatorics. Because techniques herein do not assess the impact of interactions between features, complexity of computing local perturbation-based feature attributions is reduced from exponential to linear time, which is a substantial acceleration previously thought possible only by sacrificing accuracy and stability such as with global explaining that is prone to unstable discontinuities of accuracy due to sparsity of multidimensional spatial exploration. The approach herein provides increased neighborhood density that increases explanatory accuracy and stability while, counterintuitively, also providing acceleration.

This approach has several important advantages. This approach is substantially faster than exact Shapley-based methods (polynomial vs exponential). The exact Shapley algorithm's time complexity is exponential with respect to the number of features. That is, if a single feature is added to a dataset the computation time will double. However with the approach herein, in the best case, the time complexity is linear (this occurs when there are no important features other than the trivially important features). In the worst case, the complexity of the algorithm is bound by computing the mutual information of an m by n matrix, which is polynomial ($O(n2)$), where n is the number of remaining features). Then the overall time-complexity of the worst case of the algorithm will be $O(n3)$ including removing n features from a group in the worst case. In addition to the lower running time, this approach can identify trivial features as well as groupings of features that combine to create anomalies, providing the user with more valuable information than any other method currently available.

Compared to Shapley approximations (e.g., KernelSHAP), the approach herein can be substantially faster, particularly for large datasets. Those methods use random sampling to explore features, such as stratified random sampling. Because those methods are randomized, they do not select coalitions using pairwise mutual information. However, Kernel SHAP does not remove the trivially important features from backward importance calculations, and then after the first backward step Kernel SHAP resorts to randomly sampling new coalitions to evaluate. Of course, these methods could be made faster by reducing the number of feature subsets that are evaluated; however, this would degrade the quality of their explanations, so they are normally run with larger running time budgets than are required by the approach herein.

This approach produces higher-quality explanations for large datasets. Due to intelligent search of the space of possible feature interactions, for large datasets (e.g., datasets with more than 20 features), high-quality explanations are found in less time compared to alternatives that rely on random search. This is because the approach herein obtains more useful information from each subset of features that are evaluated compared to subsets chosen purely at random, thereby providing better explanations in less time.

Compared to all other feature importance explainers, this approach provides more useful information. This approach can distinguish between trivial features and groups of features that interact to produce anomalies, providing the user with more useful information than any other method.

In an embodiment, a computer receives a request to generate a local explanation of which coalitions of features caused an anomaly detector to detect an anomaly. During unsupervised generation of a new coalition, a first feature is randomly selected from features in a dataset. Which additional features in the dataset have mutual information with the first feature that exceeds a threshold is detected when deciding which additional features can join a new coalition. For each feature that is not in the coalition, values of the feature are permuted in imperfect copies of original tuples in the dataset. An average anomaly score of the imperfect copies is measured. Based on the average anomaly score of the imperfect copies, a local explanation is generated that references (e.g. defines) the coalition.

1.0 Example Computer

FIG. 1 is a block diagram that depicts an example computer 100, in an embodiment. Computer 100 provides machine learning (ML) explainability (MLX) by using feature coalitions to generate a local explanation of why anomaly score 12 was inferred by anomaly detector 160 for anomalous tuple to explain 151. Computer 100 may be one or more of a rack server such as a blade, a personal computer, a mainframe, a virtual computer, a smartphone, or other computing device.

1.1 Black Box Model

In various embodiments, hosted in memory of computer 100 is already-trained anomaly detector 160 that can detect anomalies. In operation, anomaly detector 160 is applied to a tuple such as tuple 150 to generate an inference such as numeric anomaly score 170 that is a value of a regression or prediction. In an embodiment, anomaly score 170 is a probability. In an embodiment, anomaly score 170 is compared to a threshold to detect whether or not tuple 150 is anomalous. Tuples are explained later herein.

Anomaly detector 160 may be a black-box model that has an unknown, opaque, or confusing architecture that more or less precludes direct inspection and interpretation of the internal operation of anomaly detector 160. In an embodiment not shown, anomaly detector 160 is hosted in a different computer that is not computer 100, and computer 100 applies techniques herein by remotely using anomaly detector 160. For example, computer 100 may send tuple 150 to anomaly detector 160 over a communication network and responsively receive anomaly score 170 over the communication network. For example, computer 100 and anomaly detector 160 may be owned by different parties and/or hosted in different data centers. In various embodiments that host anomaly detector 160 in computer 100, techniques herein may or may not share an address space and/or operating system process with anomaly detector 160. For example, inter-process communication (IPC) may or may not be needed to invoke anomaly detector 160.

1.2 Machine Learning Explainability (MLX)

Approaches herein generate local explanations of anomaly detector 160. As discussed later herein, a local explanation explains anomaly score 12 by anomaly detector 160 for anomalous tuple to explain 151 that may be known or new. As discussed below, corpus 110 and/or anomaly detector 160 participate in a sequence of phases that include: training of anomaly detector 160 and MLX invocation that generates neighborhood 140 based on anomalous tuple to explain 151 before generating a local explanation.

In various scenarios, anomalous tuple to explain 151 and its anomaly score 12, and/or anomaly detector 160 are reviewed for various reasons. MLX herein can provide combinations of any of the following functionalities:
- Explainability: The ability to explain the local reasons why anomaly score 12 occurred for anomalous tuple to explain 151
- Interpretability: The level at which a human can understand the explanation
- What-If Explanations: Understand how changes in anomalous tuple to explain 151 may or may not cause same anomaly score 12
- Model-Agnostic Explanations: Explanations treat anomaly detector 160 as a black box, instead of using internal properties from anomaly detector 160 to guide the explanation For example, the explanation may be needed for regulatory compliance. Likewise, the explanation may reveal an edge case that causes anomaly detector 160 to malfunction for which retraining with different data or a different hyperparameters configuration is needed.

1.3 Corpus of Original Tuples

Training of anomaly detector 160 entails a training corpus that contains training tuples. In various embodiments, the training corpus is or is not corpus 110. In various embodiments, training of anomaly detector 160 is unsupervised or supervised, which means that the tuples of the training corpus are unlabeled or each tuple is labeled with a respective known correct inference. In any case, anomaly detector 160 is already trained in FIG. 1.

Corpus 110 may or may not be used in any of training, validation, and testing of anomaly detector 160. Essentially, original tuples 121 are a small portion of a multidimensional problem space, with each of features F1-F4 providing a respective dimension, that anomaly detector 160 could map to inferences that would provide an additional dimension to a multidimensional solution space. Features F1-F4 are collectively referred to as features 131. In an embodiment, most or all of original tuples 121 are non-anomalous.

1.4 Corpus Metadata

Corpus 110 includes metadata and data that computer 100 stores or has access to. In an embodiment, corpus metadata is stored or cached in volatile memory, and corpus data is stored in nonvolatile storage that is local or remote. Corpus data defines a portion of the multidimensional problem space and includes original tuples 121. Original tuples 121 are respective points in the multidimensional problem space. Original tuples 121 includes individual original tuples T1-T4 that collectively contain original values 122 that includes individual values V1-V9. Each of original tuples 121 contains a respective value for each of features F1-F4. For example as shown, the value of feature F1 in original tuples T1-T2 is value V1.

Corpus metadata generalizes or otherwise describes corpus data. Corpus metadata includes features F1-F4 that can describe tuple 150 that is shown with a dashed outline to demonstrate that tuple 150 may be any individual tuple of tuples 121, 141, or 151.

1.5 Feature Engineering

Tuple 150 contains a respective value for each of features F1-F4. In an embodiment, tuple 150 is, or is used to generate, a feature vector that anomaly detector 160 accepts and that contains more or less densely encoded respective values for features F1-F4. Anomalous tuple to explain 151 is shown as partially covering demonstrative vertical dashed lines that indicate that features F1-F4 have a same columnar presentation in all of tuples 121, 141, and 151. For example, the values of feature F4 in tuples 151 and P2 respectively are V0 and V7 as shown.

Each of features F1-F4 has a respective datatype. For example, features F1 and F3 may have a same datatype. A datatype may variously be: a) a number that is an integer or real, b) a primitive type such as a Boolean or text character that can be readily encoded as a number, c) a sequence of discrete values such as text literals that have a semantic ordering such as months that can be readily encoded into respective numbers that preserve the original ordering, or d) a category that enumerates distinct categorical values that are semantically unordered.

Categories are prone to discontinuities that may or may not seemingly destabilize anomaly detector 160 such that different categorical values for a same feature may or may not cause anomaly detector 160 to generate very different inferences. One categorical feature may be hash encoded into one number in a feature vector or n-hot or 1-hot encoded into multiple numbers. For example, 1-hot encoding generates a one for a categorical value that actually occurs in a tuple and also generates a zero for each possible categorical value that did not occur in the tuple.

Tuple 150 may represent various objects in various embodiments. For example, tuple 150 may be or represent a network packet, a record such as a database table row, or a log entry such as a line of text in a console output logfile. Likewise, features F1-F4 may be respective data fields, attributes, or columns that can occur in each object instance.

Anomaly score 170 is shown with a dashed outline to demonstrate that anomaly score 170 may be any individual inference for any tuple such as anomaly score 12 of anomalous tuple to explain 151. In some examples, anomaly score 170 may be a binary classification or an anomaly score that indicates whether or not tuple 150 is anomalous such as based on a threshold. When anomaly detector 160 detects an anomaly in a production environment, an alert may be generated to provoke a human or automated security reaction such as terminating a session or network connection, rejecting tuple 150 from further processing, and/or recording, diverting, and/or alerting tuple 150 for more intensive manual or automatic inspection and analysis.

Acceleration is provided by avoiding comparison of individual anomaly scores and avoiding ranking tuples. For example, this approach does not entail measuring a difference or similarity between two anomaly scores.

1.6 Sampling Neighborhood

Anomaly detector 160 generates or previously generated anomaly score 12 for original anomalous tuple to explain 151. Anomaly detector 160 may have imperfect accuracy that sometimes causes anomaly score 170 to be wrong and not match a label of tuple 150 that is an actually known correct anomaly score (or binary class such as anomaly or non-anomaly) of tuple 150.

Each of original tuples 121 may be a point in a multidimensional problem space defined by features F1-F4. Although there may be hundreds of thousands of original tuples 121 that each may be a distinct combination of values of features F1-F4 that is a distinct point in the multidimensional problem space, most or nearly all possible points in the multidimensional problem space do not occur in original tuples 121. Thus, anomaly score 170 is unknown for most or nearly all possible points in the multidimensional problem space. Thus, a global explanation based on original tuples 121 would likely have limited accuracy, especially because known points in the multidimensional problem space are usually separated by regions with many possible tuples whose anomaly score 170 is unknown.

Computer 100 generates a local explanation that is more accurate than a global explanation as follows. Anomaly score 170 depends on the values of features F1-F4 in tuple 150. By concentrating the generation of an explanation on the neighborhood of possible points that surround anomalous tuple to explain 151 in the multidimensional problem space, the accuracy of the local explanation is increased. Neighborhood 140 uses sampling of original values 122 to explore the locale around anomalous tuple to explain 151 as follows.

Neighborhood 140 generates permuted tuples 141 that are probabilistic variations of anomalous tuple to explain 151 based on original values 122. Perturbation entails synthesizing new tuples as imperfect copies of old tuples. Permutation is different from other kinds of perturbation because permutation does not entail a randomly generated value of a feature and does not entail a predefined meaningless special value of a feature such as a null or zero.

1.7 Beyond Lime and Kernel SHAP

How the state of the art generates perturbed tuples depends on how those perturbed tuples are used to detect feature importance and generate ML explanations (MLX) as explained later herein. Benefits of permutation are not achieved by other kinds of perturbation due to design limitations as follows.

For example, Shapley additive explanation (SHAP) is presented in non-patent literature (NPL) "A unified approach to interpreting model predictions" published by Scott Lundberg et al in Advances In Neural Information Processing Systems 30 (2017) that is incorporated in its entirety herein. Due to SHAP's additive approach, perturbation with SHAP's so-called "missing value" is a predefined meaningless special value of a feature such as a null or zero, which may confuse and destabilize inferencing by anomaly detector 160.

SHAP is unreliable in additional ways. Most embodiments of anomaly detector 160 are non-linear, such as a neural network. As explained later herein, related features are grouped into coalitions that correspond to natural modalities. The values distributions of related features often are not independent, which means there may be correlations between features. If SHAP is used with an ML model that is not linear or used with features that are not independent, then SHAP is unreliable unless perturbed tuples are exhaustively generated according to combinatorics that may be computationally intractable.

As another example, local interpretable model-agnostic explanations (LIME) is presented in NPL "Why should I trust you? Explaining the predictions of any classifier" published by Marco Ribeiro et al in Proceedings of the 22nd ACM SIGKDD International Conference on Knowledge Discovery and Data Mining (2016) that is incorporated in its entirety herein. LIME's perturbation entails a so-called "grayed out" value that is equivalent to SHAP's "missing value".

In ways discussed later herein, embodiments herein may combine SHAP or LIME or both (i.e. kernel SHAP as presented in the SHAP NPL) with the following novel permutation techniques. State of the art perturbation by LIME and kernel SHAP is prone to generating unrealistic perturbed tuples because a missing value (e.g. null or zero) is always or almost always unrealistic. For example, a null in almost any feature might cause any tuple to be anomalous. Lack of realism is compounded when multiple features are missing values in a perturbed tuple, which is unavoidable with SHAP.

1.8 Realistic Combinations of Values

To some extent, lack of realism may be mitigated by using natural values for perturbation instead of a predefined blank value. For example, a perturbed value may be randomly generated from a natural range of a feature. If the feature is a wheel count of a vehicle that may range from a unicycle to a freight truck, there may be value(s) that are in the range but still unnatural such as five wheels.

Permutation is a special way of perturbation with random sampling of original tuples 121 that preserves the values distribution of each feature. Random sampling of values by permutation is not the same activity as random generation of values by conventional perturbation. Even if values are limited to natural values such as values that actually occur for feature F3 in original values 122, a set of perturbed tuples generated without random sampling may have an unrealistic distribution. For example, values V3, V6, and V8 are the only values for feature F3 in original values 122 but, because value V3 predominates for feature F3 in original values 122, it would be unrealistic to generate an equal count of perturbed tuples that respectively have values V3, V6, and V8 for feature F3. In other words, realistic perturbed feature values may still cause generation of an unrealistic neighborhood having realistic perturbed tuples.

Even if value distributions are preserved by permutation, a compound value of a combination of features may be unrealistic. For example, feature F1 may be the score of a team that won an American professional football game, and feature F2 may be the score of a team that lost that game. A score of 6-0 or a score of 6-1 is possible, but a permuted score of 1-1 is naturally impossible.

In those various ways, a perturbed tuple may have a value or combination of values that is unrealistic or unnatural, and a neighborhood composed of realistic permuted tuples may itself be unrealistic due to unrealistic or unnatural frequencies. Novel permutation based on coalitions of features herein avoids those pitfalls. Thus, neighborhood 140 is more realistic than the state of the art and provides benefits discussed later herein.

1.9 Permutation of Coalitions

As discussed above, permutation is based on unsupervised dynamic discovery of feature coalitions based on statistically correlated subsets of features 131. Permuted tuples 141 contains multiple (e.g. three as shown) permuted variations of anomalous tuple to explain 151 for a coalition that consists of unpermuted features F1 and F3. Each of permuted tuples 141 is almost a perfect copy of anomalous tuple to explain 151, except that the values of features F2 and F4 that are not in the coalition are permuted (i.e. randomly sampled and not copied from anomalous tuple to explain 151). Permuted 144 shows YES to demonstratively indicate that non-coalition features F2 and F4 are permuted in the shown subset of permuted tuples 141. However, permuted tuples 141 may also contain an equal amount of unshown tuples that respectively permute other coalitions. In other words, permuted tuples 141 may have a count of tuples that is a multiple of a count of coalitions.

Permuted 144 shows NO for coalition features F1 and F3 that means that features F1 and F3 are not permuted in permuted tuples P1-P2 and P4. The values of permuted or unpermuted features F1-F4 for permuted tuple P1-P2 and P4 are shown in respective rows of values 142.

Values of permuted non-coalition features F2 and F4 for permuted tuples P1-P2 and P4 are not taken from anomalous tuple to explain 151, but are instead taken from respective randomly sampled original tuples 121 respectively for permuted tuples P1-P2 and P4.

Permuted values of non-coalition features F2 and F4 are randomly sampled from values of features F2 and F4 in original values 122. For example as shown in values 142, permuted tuples P1-P2 and P4 have respective values of non-coalition features F2 and F4 from randomly sampled original tuples T1-T2 and T4. Thus, the values distribution of coalition features F2 and F4 in permuted tuples P1-P2 and P4 is bounded by the same value range as the original values of features F2 and F4 and should have more or less a same probability distribution of value frequencies. In the shown embodiment, permuted values of non-coalition features F2 and F4 are taken from a same original tuple to generate one permuted tuple. That is, each permuted tuple is a hybrid of one randomly sampled original tuple and anomalous tuple to explain 151. For example, permuted tuples P1-P2 and P4 take permuted values for non-coalition features F2 and F4 from respective randomly sampled original tuples T1-T2 and T4.

Because sampling is random, some statistical distortions may occur. For example, some of original tuples 131 might not be sampled for any coalition. For example for the shown coalition, original tuple T3 is not sampled.

In an embodiment, random selection entails generating real numbers that are inclusively or exclusively between zero and one, and such a real number can be scaled to fit into an integer range that is limited by a count of original tuples 121. For example, the random number may be scaled to be in a range of 0-3 for original tuples T1-T4 respectively. In various embodiments, a permuted tuple should not match: a) anomalous tuple to explain 151 nor b) any other permuted tuple. For example if permuted values from a randomly selected one of original tuples 121 causes such a match, then another one of original tuples 121 may be randomly selected until a unique permuted tuple is generated.

1.10 Mutual Information for Coalition Generation

Unsupervised discovery of feature coalitions (i.e. correlated subsets of features 131) is as follows. Based solely on original values 122, mutual information is measured for each distinct pair of features 131. For example, mutual information MI1_2-MI1_4 are respectively measured for each distinct pair of feature F1 with respective other features F2-F4.

For example, mutual information MI1_3 is the measured mutual information between features F1 and F3. In that case, mutual information measures how interdependent (e.g. correlated) are the values distribution of feature F1 and the values distribution of feature F3. Mutual information is a numeric score ranging from: a) a maximum that indicates that one features' value is always predictable from the other feature's value to b) a minimum that indicates that one features' value is always independent of the other feature's value.

As discussed later herein, a feature coalition is automatically generated when a subset of features 131 have sufficient mutual information with a particular feature. In this example, the particular feature is F1, and only mutual information MI1_3 is sufficient (e.g. exceed a threshold), but mutual information MI1_2 and MI1_4 are insufficient. In that case, the coalition consists of features F1 and F3 but not features F2 and F4.

As discussed later herein, a coalition is empirically tested and, if rejected, the coalition's features may be reassigned to other coalitions or excluded. Dynamically increasing the mutual information threshold needed for a feature to join a coalition may cause generation of smaller (i.e. fewer features) and more relevant coalitions for MLX.

1.11 Local Explanation Based on Various Test Scores

Within memory of computer 100, a local explanation may be a data structure that is based on or contains a ranking of features 131 by importance score and/or exclude a threshold count of least influential features or features whose importance score falls below a threshold. For example a local explanation may be limited to a top two most influential features or a variable count of features having an importance score of at least 0.4. Explanation generation based on coalitions is discussed later herein.

Generated feature selections (i.e. subsets) are empirically tested for various purposes herein. Testing herein is unsupervised because the test tuples (e.g. permuted tuples 141) are unlabeled. Herein, a test score of a feature or coalition is the average anomaly score inferred by anomaly detector 160 when the feature or coalition is excluded or is the sole inclusion in input to anomaly detector 160.

In an embodiment, most or all of original tuples 121 are non-anomalous, which provides a low test score. In an embodiment, any of original tuples 121 is discarded if anomaly detector 160 infers an anomaly score that exceeds a threshold.

Being imperfect copies of anomalous tuple to explain 151, permuted tuples 141 are likely to be anomalous too, which provides a high test score. Removal of insignificant features or coalitions from anomalous test tuples such as permuted tuples 141 is unlikely to change the high test score. Removal of significant features or coalitions from the anomalous test tuples is likely to decrease the high test score. Thus, the importance of a feature coalition or an individual feature can be empirically measured.

Herein, removal of a feature or coalition does not alter the format of the feature vector that anomaly detector 160 accepts. Instead, removed feature(s) have their values replaced by permutation based on a randomly sampled original tuple as discussed earlier herein. Coalition permutation should decrease a high test score if and only if the coalition is important (i.e. causal of the anomaly).

A test score may be unit normalized to a range of zero to one. A predefined example threshold of 0.5 is used to detect whether a test score indicates that test tuples on average are predominantly anomalous or non-anomalous. For example, permuted tuples 141 are likely anomalous, and a low test score would indicate that anomaly detector 160 is confused such as by removal (i.e. permutation) of an important feature or coalition. Conversely, a high test score would indicate that anomaly detector 160 is not confused by removal (i.e. permutation) of an unimportant feature or coalition.

1.12 Example Test Score Measurement

The following example evaluation pseudocode generates permuted tuples 141 from anomalous tuple to explain 151. The input feature_set is the set of features to leave unpermuted. All other features are permuted. The output Average_predicted_probabilities is the test score as discussed above.

- Evaluate

- Inputs:
    - feature_set: Set of features that we want to compute the models prediction while we keep their value and perturb the value of all features in the data set, except those ones in feature_set (features_to_shuffle)
    - number_of_substitutions: The number of times we want to substitute the value of our data instance's feature_to_shuffle columns with its neighbors
  - Outputs:
    - Average_predicted_labels: Average of #number_of_substitutions model's predictions.
    - Average_predicted_probabilites: Average of #number_of_substitutions model's predictions' probabilites.
  1. Create a set of features_to_shuffle, which are all the features in the dataset, except those ones in the feature_set
  2. Initialize predicted_labels, predicted_probabilities, and perturbed_instances to each be an empty list
  3. reduced_dimension dataset ← reduce the dimension of the dataset by removing the features_to_shuffle columns
  4. nearest_neighbors ← find number_of_substitutions nearest neighbors of the data instance in the reduced_dimension_dataset
  5. for each nearest_neighbor in list of nearest_neighbors:
     a. perturbed_instance ← substitute the features_to_shuffle columns' values of the data instance with the values from nearest_neighbor
     b. append perturbed_instance to perturbed_instances list
  6. for each perturbed_instance in list of perturbed_instances:
     a. predicted_label ← call model's predict function on the perturbed_instance
     b. predicted_probability ← call model's predict_proba function on the perturbed_instance
     c. append predicted_label to predicted_labels and predicted_probability to predicted_probabilities
  7. Average_predicted_labels ← compute average of the predicted_labels list
  8. Average_predicted_probabilities ← compute average of the predicted_probabilities list
  9. return Average_predicted_labels and Average_predicted_probabilities 2.0 Example Coalition Generation The following example grouping pseudocode generates feature coalitions. The input remaining_features is the set of features that are eligible for grouping, which might not be all of features 131 as discussed later herein.

- Group Finder

- Inputs:
    - remaining_features : Set of features that are all the features in the dataset, except for those in trivially_important_features that we computed in forward importance block
    - mutual_info : A matrix containing of the pair-wise mutual information between features
  - Output:
    - List of found groups
  1. thresholds ← Find unique values of mutual_info matrix and sort them (ascending order)
  2. initialize identified_groups to an empty list
  3. threshold ← first threshold in the thresholds (smallest mutual information between the remaining features)
  4. Until have at least one group in identified_groups:
     a. ungrouped_features ← a copy of reamining_features
     b. While there are some features in ungrouped_features list:
        I. initialize candidate_group to an empty list
        II. selected_feature ← choose one of the ungrouped_features at random
        III. Add selected_feature to the candidate_group
        IV. remove selected_feature from ungrouped_features
        V. for each candidate_feature in ungrouped_features:
           - if the mutual information between the candidate feature and all the features in the candidate_group is more than the threshold:

| |
|---|
| • Group Finder |
|            i. Add candidate_feature to the candidate_group<br>           ii. remove candidate_feature from ungrouped_features<br>      VI. if length of candidate_group is more than 1:<br>          ▪ Add candidate_group to the identified_groups<br>    c. if reached the end of thresholds list:<br>        I. break the loop<br>    d. else:<br>        I. threshold ← next threshold in the thresholds list<br>5. Return groups |

The above grouping pseudocode uses only the mutual information for distinct pairs of features 131. The above grouping pseudocode does not use anomaly detector 160 nor anomalous tuple to explain 151. The above internal variable ungrouped_features is an unordered pool of features that await assignment to a coalition.

That pool is fully repopulated when step 4.a repeats in each iteration of loop 4 in the above grouping pseudocode. Above step II randomly selects a first feature of a new coalition. Above step V adds feature(s) to the coalition based on mutual information as discussed earlier herein. Above step 1 dynamically selects mutual information thresholds as discussed later herein.

Above step 5 returns zero or more distinct coalitions of same or different sizes (i.e. counts of features). A feature may be in zero or more coalitions. Every coalition has at least two features. One coalition may contain all of the features of another coalition plus at least one additional feature.

2.1 Example Feature Grouping Process

Figure 2:
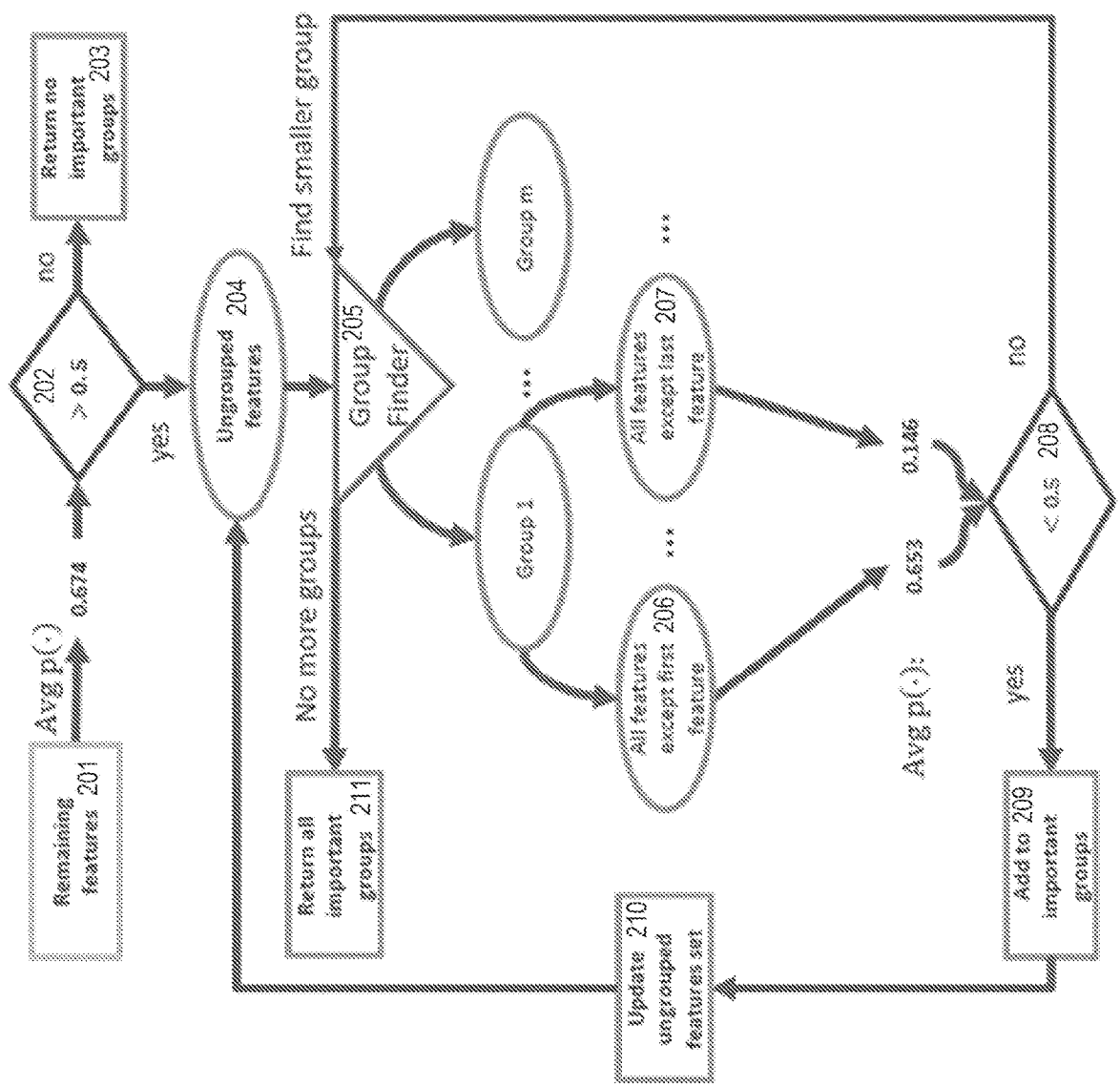
FIG. 2 is a flow diagram that depicts an example computer process for unsupervised generation of feature coalitions.

FIG. 2 is a flow diagram that depicts an example feature grouping process performed by computer 100, in an embodiment. Generation of feature coalitions occurs in the following novel way that is unsupervised because relative importances of individual features F1-F4 are ignored during this process. FIG. 2 is discussed with reference to FIG. 1.

The goal of the process of FIG. 2 is to reach step 211 that returns only important groups of features, which does not mean that the features in an important group are individually important. Herein, a feature group and a feature coalition are synonyms. In other words, step 211 returns coalitions, some or all of which may prove important enough to be referenced by a local explanation that computer 100 generates.

First step 201 receives input that identifies so-called remaining features, which are some or all of features 131 that may be included in coalitions. As explained later herein, importance of coalitions and accuracy of an explanation are increased when noisy features are excluded from the remaining features.

Anomaly detector 160 is tested between steps 201-202 to generate a test score (i.e. an average anomaly score) based on retention of remaining features 201 and removal (i.e. permutation) of all excluded features. If most of the explanatory power is provided by the excluded features, then anomaly detector 160 will be confused by the exclusion of important features, which would cause a low test score (i.e. anomalies mistaken as non-anomalies) that step 202 detects. In that case, the remaining features are irrelevant, and there is no need to discover coalitions of other features, in which case step 203 terminates the process of FIG. 2.

If step 202 instead detects a high test score that indicates that anomaly detector 160 did not become confused, then that indicates that remaining features 201 are collectively important but individually not important enough to be excluded as noisy as discussed above. In that case, remaining features 201 contains important coalitions to be discovered. Ungrouped features 204 is a pool of features that are available to join a coalition, which initially is all of remaining features 201.

The above grouping pseudocode implements group finder 205 that organizes ungrouped features 204 into groups 1-$m$. In an embodiment discussed later herein, a group is excluded if the group receives a test score from the above evaluation pseudocode below a predefined threshold such as 0.5 when only the group's features are retained (i.e. not removed by permutation). Shown group 1 is not excluded, and its constituent features are individually tested in steps 206-207. Each of steps 206-207 uses the above evaluation pseudocode to generate a respective test score for a respective feature in group 1. Steps 206-207 test a feature by removing (i.e. permuting) the feature and retaining only the other features in the group.

Step 208 is repeated after each of steps 206-207. For example if group 1 consists of three features, then step 208 is repeated three times. Step 208 detects whether a test score of a group feature falls below a threshold that indicates that anomaly detector 160 became confused when the feature was removed. A low test score indicates that the feature is an important part of the coalition. Features of the group with high test scores are excluded from the group. If after exclusion of high scoring features, the group still contains multiple features, then: a) step 209 adds the group to the set of important groups discovered so far, and b) step 210 prevents the group's features from joining other groups.

The arrow that transitions from step 208 back to step 205 causes additional smaller groups to be generated by increasing a mutual information threshold as discussed earlier and later herein. However, size (i.e. feature count) of groups generated by group finder 205 are not guaranteed to be monotonically decreasing.

2.2 Example Exploration Process

The following example coalition exploration pseudocode may be an implementation of the process of FIG. 2.

- Backward Importance Block
  - Inputs:
    - remaining_features: Set of features that are all the features in the dataset, except for those in trivially_important_features that computed in forward importance block.
    - mutual_info: A matrix containing of the pair-wise mutual infromation between features.
    - feature_importances: A vector containing the importance of each feature.
  - Outputs:
    - feature_importances: A list containing the importance of each feature.
    - important_groups: A list contatining lists that contains name of each group members.
1. Initialize important_groups to an empty list
2. Initialize old_groups to an empty list
3. Initialize overall_threshold to 0
4. thresholds ← Find unique values of mutual_info matrix and sort them (ascending order)
5. While the Average_predicted_labels when calling Evaluate (feature_set=remaining_features) is greater than 0.5
   A. # At least 50% of the time the model predicted that the point was an anomaly knowing only the values of the remaining features
   B. Find groups of features by calling Group Finder (remaining_features, mutual_info, overall_threshold)
   C. While groups are same as old groups:
      I. overall_threshold ← overall_threshold + 1
      II. If reach the end of thresholds list (overall_threshold >= length(thresholds) – 1):
         I. return
            important_group
            s,
            feature_importan
            ces_lists
      III. groups = Group Finder (remaining_features, mutual_info, overall_threshold)
   D. old_groups = groups
   E. For each group in groups:
      I. Initialize candidate_groupto an empty list
      II. Average_predicted_labels_group, Average_predicted_probabilities_group ← Call Evaluate (feature_set=[features in the desired group])
      III. If the Average_predicted_labels_group is greater than 0.5 (the point is an "anomaly"):
         i. for each feature in the group:
            1. other_features ← All the features in the group, but selected feature
            2. Average_predicted_labels_feature, Average_predicted_probabilities_feature ← Call Evaluate (feature_set=[other_features])
            3. backward_value ← Call Shapley Contribution (N=number of all features in the dataset, S=number of features in the group, f_with=Average predicted_labels_group, f_without=Average_predicted_labels_feature)
            4. Add backward_value to the feature_importances[feature]
            5. If the Average_predicted_labels_feature is less than 0.5 (model believes the point becomes a "normal" point):
               1. Add feature to candidate_group
      IV. If candidate_group contains more than one feature:
         i. add candidate_group to important_groups
6. Return important_groups, feature_importances lists Above line 5.E.III.i.3 calculates a Shapley importance shown as the so-called backward_value for each feature individually. The following example Shapley pseudocode may calculate the importance of a feature.

---

• Shapley Contribution

○ Inputs:
  ■ N : number of features
  ■ S : Length of the group
  ■ prediction_with_f: Prediction of the model while having the feature
  ■ prediction_without f: Prediction of the model when we remove that feature
○ Output:
  ■ Shapley_Contribution
1. Shapley_Contribution ← (S! * (N-S-1)!/N!) * (prediction_with_f - prediction_without_f)
2. return Shapley_Contribution

---

3.0 Example Filtration Process

A technical problem is that a feature may be so important that any coalition that includes the feature would be scored as an important coalition, which may prevent discovery of a truly important coalition composed of less important features. The process of FIG. 3 excludes features that are so important that they would distort coalition generation.

Figure 3:
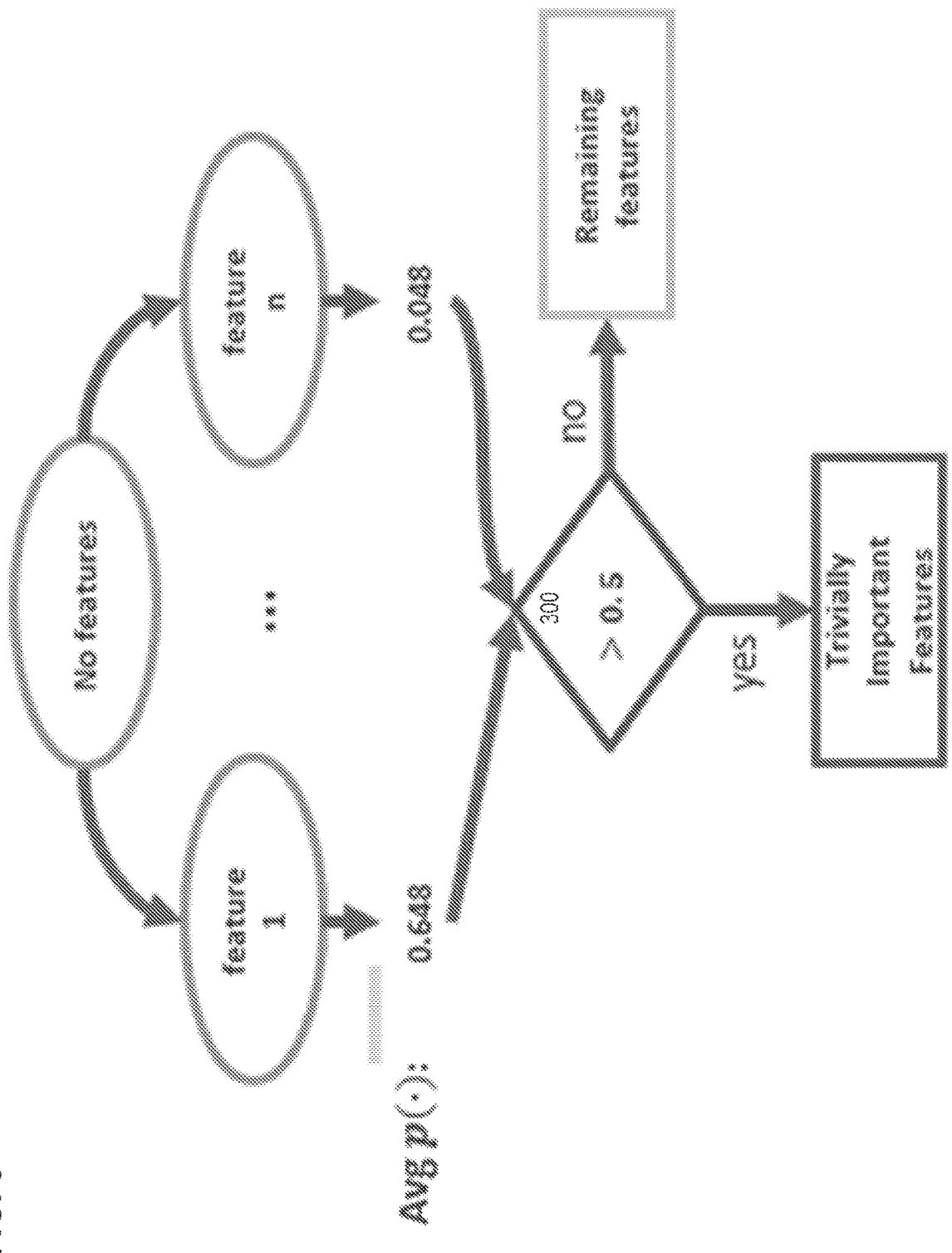
FIG. 3 is a flow diagram that depicts an example computer process for feature filtration.

FIG. 3 is a flow diagram that depicts an example feature filtration process performed by computer 100, in an embodiment. A feature that by itself causes many anomalies should be excluded from coalition generation (but not excluded from local explanation generation). FIG. 3 is discussed with reference to FIG. 1.

Filter 300 detects whether an unpermuted feature by itself and all other features permuted (i.e. removed) causes a high test score that exceeds a threshold (e.g. 0.5) that indicates that anomaly detector 160 only needs the unpermuted feature to detect anomalies. In that case, the unpermuted feature is too important and should be excluded from coalition generation as a so-called trivially important feature that may nonetheless be referenced by a local explanation but not by a coalition.

Any feature that is not excluded by filter 300 as trivially important is instead one of the so-called remaining features also shown as remaining features 201 on FIG. 2. Filter 300 is repeated for each feature 1-$n$ (i.e. features 131).

The following example filtration pseudocode may be an implementation of the process of FIG. 3.

---

• Forward Importance Block

○ Inputs:
  ■ dataset : The dataset in which we want to explain the desired data instance
○ Outputs:
  ■ trivially_important_features : A list containing the name of trivially important features.
  ■ feature_importances : A list containing the importance of each feature.
1. Initialize feature_importances to a list of zeros (of length equal to the number of features in the dataset).
2. Initialize trivially_important_features to an empty list
3. For each feature and feature_index in the dataset:
   A. Average_predicted_label, Average_predicted_probability ← Call Evaluate (feature_set=[feature])
   B. forward_value ← Call Shapley Contribution (N=number of all features in the dataset, S=0, f_with=Average_predicted_probabilities, f_without=0)
   C. Add forward_value to feature_importances[feature_index]
   D. if Average_predicted_label is more than 0.5:

---

-continued

• Forward Importance Block

I. # At least 50% of the time the model predicted that the point was an anomaly knowing only the value of the current feature
  II. Add the feature to trivially important_features list
4. Return trivially_important_features, feature_importances

---

4.0 Example Importance Scoring Process

Figure 4:
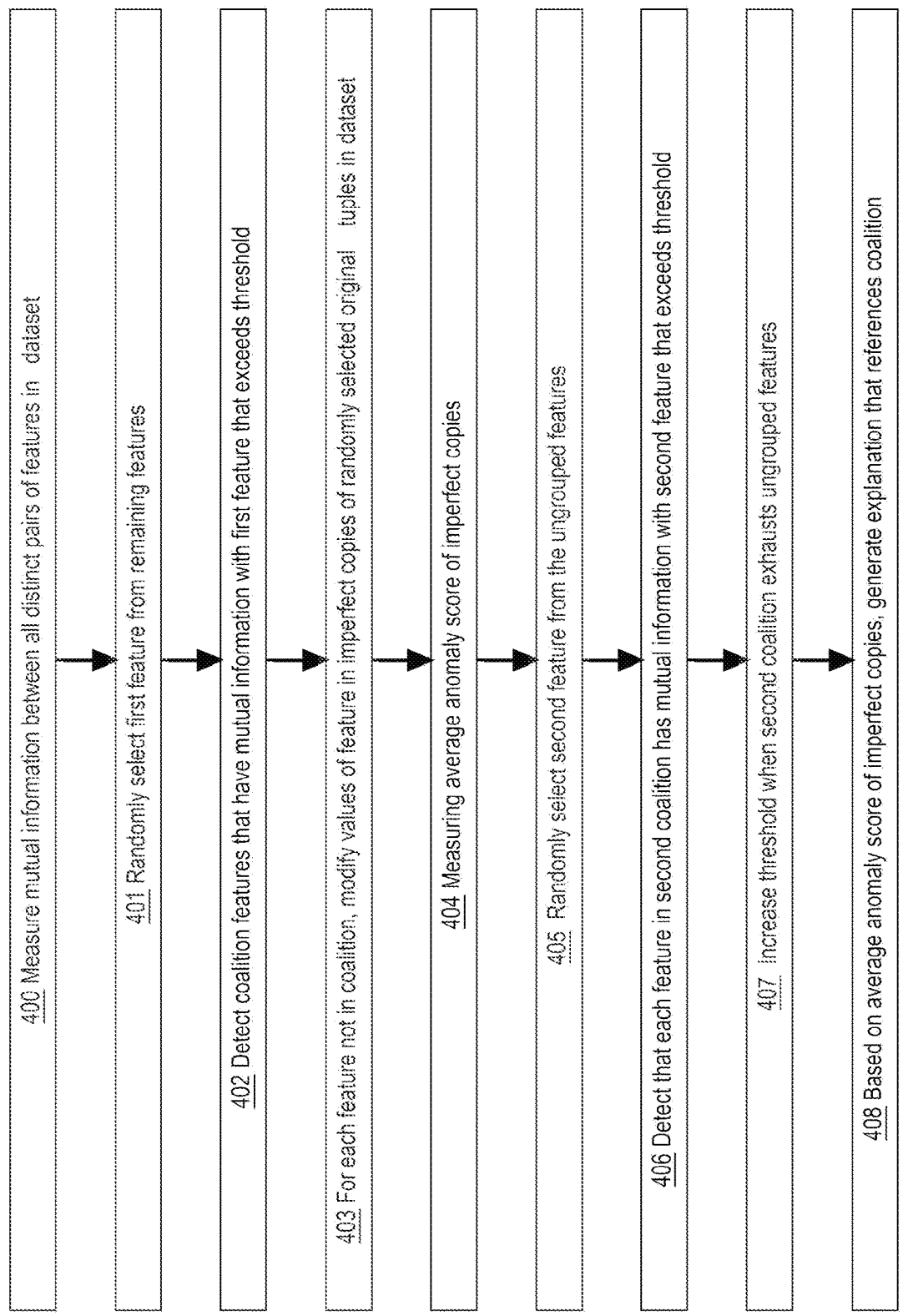
FIG. 4 is a flow diagram that depicts an example computer process that uses feature coalitions to generate a local explanation of why an anomaly score was inferred by an anomaly detector for an anomalous tuple to explain.

FIG. 4 is a flow diagram that depicts an example process that an embodiment of computer 100 may perform to provide machine learning (ML) explainability (MLX) by using feature coalitions to generate a local explanation of why anomaly score 12 was inferred by anomaly detector 160 for anomalous tuple to explain 151. FIG. 4 is discussed with reference to FIGS. 1-3. The steps of FIGS. 2 and 4 are complementary and may be combined or interleaved.

The process of FIG. 4 occurs in a preparatory first phase and a (e.g. much later) runtime MLX second phase. The preparatory first phase performs preparatory step 400 and the preparatory filtration process of FIG. 3. Step 400 measures mutual information between all distinct pairs of features 131 in corpus 110. The preparatory first phase may occur as soon as original tuples 121 are obtained.

The runtime MLX second phase and its steps 401-408 are caused by an eventual request for a local explanation of why anomaly detector 160 scored tuple to explain 151 as anomalous. The filtration process of FIG. 3 selects the so-called remaining features, also shown as remaining features 201 on FIG. 2. Step 401 randomly selects a first feature from remaining features 201 to generate a new coalition. Steps 401-404 generate a first coalition.

Step 402 detects zero or more features that have mutual information with the first feature that exceeds a mutual information threshold and adds those features to the first coalition Step 403 tests the importance of the first coalition, which is not the same as testing the importances of the coalition features individually. For example, an important coalition may consist solely of less important features. The state of the art ignores the less important features and their coalition.

In imperfect copies (i.e. permuted tuples 141) of randomly selected tuples in original tuples 121, step 403 permutes values of all features that are not in the first coalition. Step 404 measures the test score of the first coalition, which is the average anomaly score inferred by anomaly detector 160 for permuted tuples 141.

If step 404 detects a high test score, then the first coalition is retained as important. Otherwise, the first coalition is discarded as unimportant, and its features may be reused to generate other coalitions.

Ungrouped features 204 in FIG. 3 is a pool of features that are still available to generate a new coalition. If the first coalition is retained as important, then its features are excluded from ungrouped features 204. That may or may not cause some or all generated coalitions to be disjoint (i.e. no overlap in features). Steps 405-406 use ungrouped features 204 to generate a second coalition in more or less the same way that the first coalition was generated.

Step 405 randomly selects a second feature from ungrouped features 204 to generate a second coalition. Step 406 detects zero or more features of ungrouped features 204 that have mutual information with the second feature that exceeds the mutual information threshold and adds those features to the second coalition.

When ungrouped features 204 is exhausted (i.e. empty), step 407: a) increases the mutual information threshold, b) repopulates ungrouped features 204 with all of remaining features 201, and c) resumes grouping (i.e. coalition generation). A high mutual information threshold generally (i.e. not monotonically) causes generation of smaller and fewer coalitions. Eventually the mutual information threshold is so high that coalition formation is impossible or the mutual information threshold has reached its maximum and, in either case, grouping ceases.

A novel strategy for increasing the mutual information threshold is based on the actual mutual information measurements by preparatory step 400. In an embodiment, any increase of the mutual information threshold by step 407 entails selecting a next mutual information score (i.e. numeric measurement) from a sequence of monotonically increasing scores that is based on features 131 in original values 122 of original tuples 121. In an embodiment, the sequence of mutual information scores is generated in the preparatory first phase from mutual information measurements by preparatory step 400. In an embodiment, generating the sequence of mutual information scores entails: a) optionally excluding duplicate mutual information scores and b) sorting the mutual information scores in ascending order.

After grouping, based on average anomaly scores of coalitions as discussed earlier herein, step 408 generates a local explanation that references important coalition(s). In a novel example not achieved by the state of the art, the local explanation ranks one coalition as more important than another coalition that contains the most individually important feature. In another novel example, the local explanation ranks one coalition as more important than another coalition that contains the highest average of individual feature importances. In another novel example, the local explanation ranks individual features based on the importance of the feature's coalition when combined or not combined with the feature's individual importance. Herein, feature importance or coalition importance may be a test score measured by excluding the feature or coalition or by including only the feature or coalition as discussed earlier herein, or combining both inclusion and exclusion test scores, or by combining a feature test score with a test score of a coalition that contains the feature. Based on any of those importance scores, features or coalitions may be ranked in a local explanation.

5.0 Example Local Explanation Process

The following example main pseudocode may be an integration of the processes of FIGS. 2-4.

---

Main Algorithm

- Inputs:
  ○ data instance: The anomaly of interest for which the model's prediction is to be explained.
  ○ dataset: A reference training/validation/test data set; It should represent normal data, but it is acceptable if it contains some anomalies as well.
  ○ model: A trained, black-box, machine learning model.
- Outputs:
  ○ feature_importances: A list containing the importance of each feature.
  ○ trivially_important_features: A list containing the name of trivially important features.
  ○ important_groups: A list containing lists that contains name of each group members.
1. trivially_important_features, feature_importances ← Call Forward Importance Block (input: dataset)
2. remaining_features ← all features in the dataset, except for those in trivially_important_features
3. mutual_info ← Compute the mutual information between all pairs of features in remaining_features.
4. important_groups, feature_importances ← Call Backward Importance Block (input: remaining_features, mutual_info, feature_importances)
5. Return the feature_importances, trivially_important_features, important_groups lists

---

The outputs of the above main pseudocode may be used to generate a local explanation. For example, output important groups may define coalitions that should be referenced by a local explanation. In an embodiment, a coalition importance as discussed earlier herein such as a test score (i.e. average anomaly score) is available for each important coalition, and a local explanation may: a) reference a threshold count or percentage of coalitions having a highest numeric importance and/or b) sort coalitions by importance.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
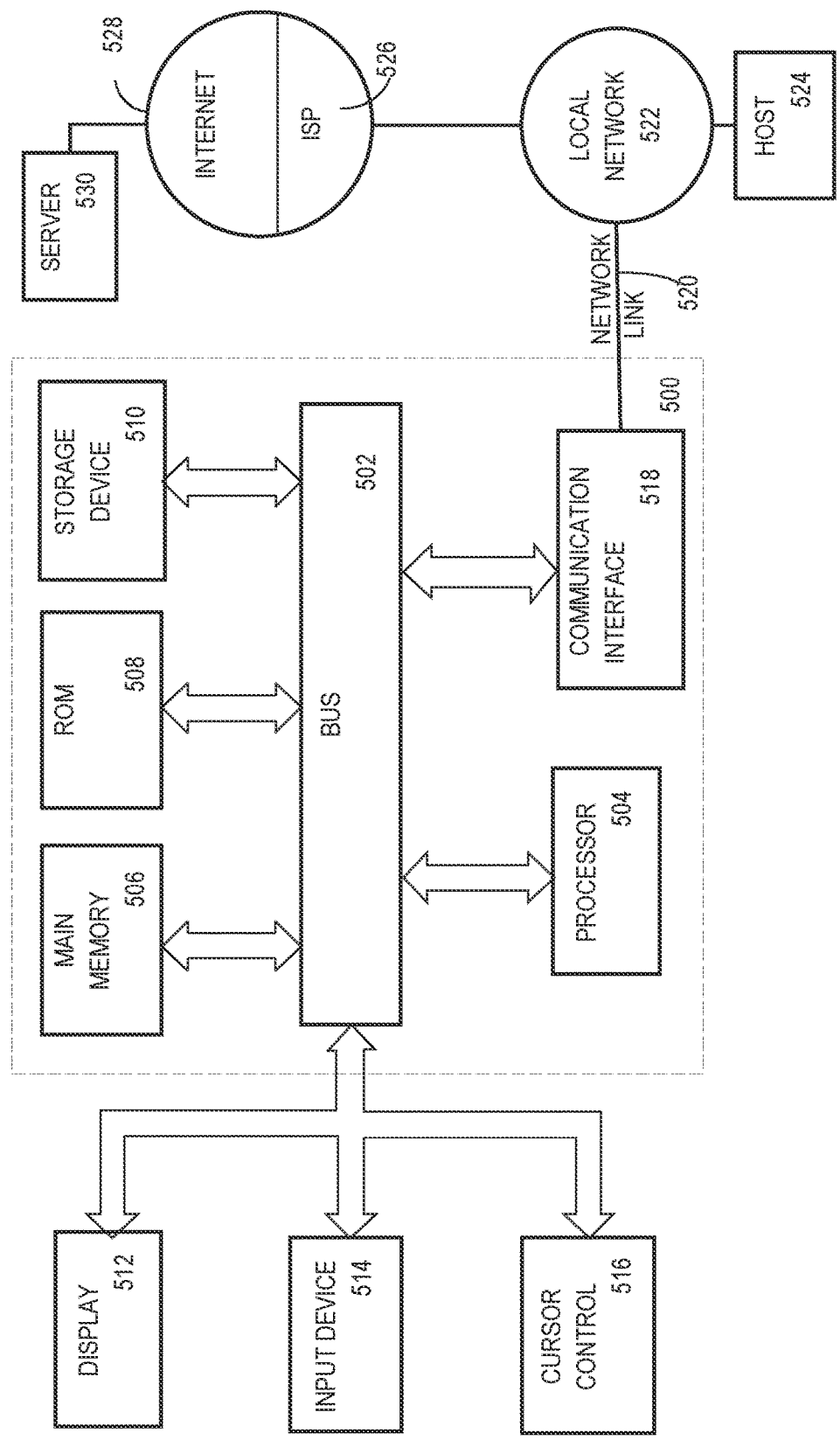
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
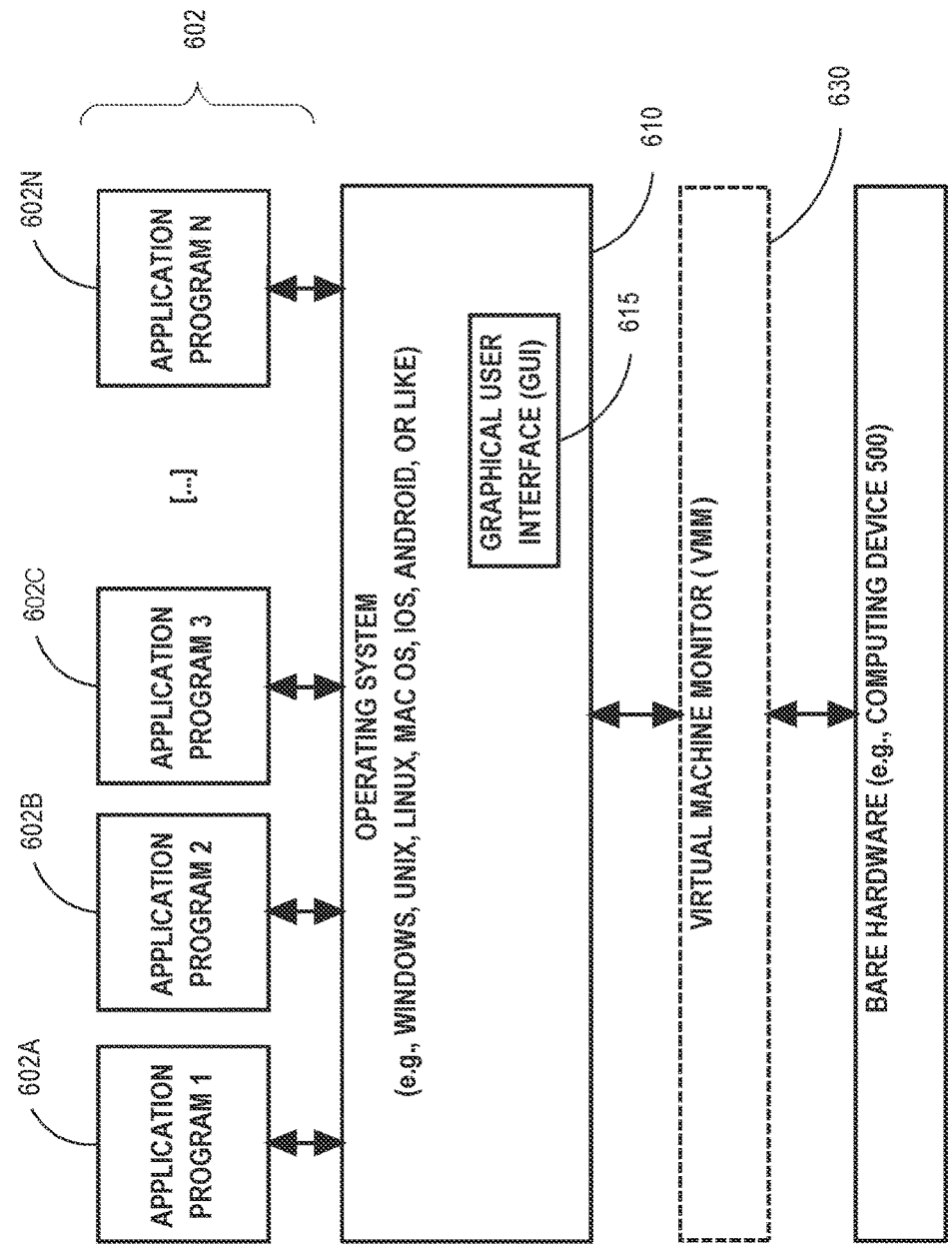
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   selecting a first feature from features in a dataset;
   detecting that each feature in a subset of the features in the dataset have mutual information with the first feature that exceeds a threshold;
   modifying, for each feature not in said subset of features, values of the feature in imperfect copies of original tuples in the dataset;
   measuring an average anomaly score of said imperfect copies; and
   generating, based on the average anomaly score of said imperfect copies, an explanation that references the subset of the features.

2. The method of claim 1 wherein:
   said subset of the features is a first subset;
   ungrouped features of the features excludes the first feature and the first subset of the features;
   the method further comprises:
      selecting a second feature from the ungrouped features of the features, and
      detecting that each feature in a second subset of the ungrouped features have mutual information with the second feature that exceeds the threshold;
   the explanation further references the second subset of the ungrouped features.

3. The method of claim 2 further comprising increasing the threshold when the second subset contains all of the ungrouped features.

4. The method of claim 2 wherein the first subset of the features contains more than two features.

5. The method of claim 2 wherein the first subset and the second subset are disjoint.

6. The method of claim 1 further comprising measuring mutual information between all distinct pairs of the features in the dataset before said modifying the values in the imperfect copies.

7. The method of claim 6 further comprising reassigning distinct values of said measuring the mutual information to the threshold.

8. The method of claim 1 wherein:
   said modifying the values in the imperfect copies is a first modifying first imperfect copies;
   anomaly scores for the original tuples are anomaly probabilities;
   the method further comprises before said first modifying:
      second modifying, excluding a second feature, values of the features in second imperfect copies of original tuples in the dataset, and
      excluding, from the features in the dataset, the second feature when an average anomaly probability for the second imperfect copies exceeds a threshold.

9. The method of claim 1 wherein the dataset is unlabeled.

10. The method of claim 1 wherein:
    said modifying the values in the imperfect copies is a first modifying first imperfect copies;
    said anomaly scores for the original tuples are anomaly probabilities;
    the method further comprises second modifying, for each feature not in a second subset of features, values of the features in second imperfect copies of original tuples in the dataset;
    said generating the explanation excludes, based on the average anomaly probability for the second imperfect copies, the second subset of features.

11. One or more non-transitory computer-readable media storing instructions that, when executed by one or more processors, cause
    selecting a first feature from features in a dataset;
    detecting that each feature in a subset of the features in the dataset have mutual information with the first feature that exceeds a threshold;

modifying, for each feature not in said subset of features, values of the feature in imperfect copies of original tuples in the dataset;

measuring an average anomaly score of said imperfect copies; and generating, based on the average anomaly score of said imperfect copies, an explanation that references the subset of the features.

12. The one or more non-transitory computer-readable media of claim 11 wherein:

said subset of the features is a first subset;

ungrouped features of the features excludes the first feature and the first subset of the features;

the instructions further cause:

selecting a second feature from the ungrouped features of the features, and detecting that each feature in a second subset of the ungrouped features have mutual information with the second feature that exceeds the threshold;

the explanation further references the second subset of the ungrouped features.

13. The one or more non-transitory computer-readable media of claim 12 wherein the instructions further cause increasing the threshold when the second subset contains all of the ungrouped features.

14. The one or more non-transitory computer-readable media of claim 12 wherein the first subset of the features contains more than two features.

15. The one or more non-transitory computer-readable media of claim 12 wherein the first subset and the second subset are disjoint.

16. The one or more non-transitory computer-readable media of claim 11 wherein the instructions further cause measuring mutual information between all distinct pairs of the features in the dataset before said modifying the values in the imperfect copies.

17. The one or more non-transitory computer-readable media of claim 16 wherein the instructions further cause reassigning distinct values of said measuring the mutual information to the threshold.

18. The one or more non-transitory computer-readable media of claim 11 wherein:

said modifying the values in the imperfect copies is a first modifying first imperfect copies;

anomaly scores for the original tuples are anomaly probabilities;

the instructions further cause before said first modifying:

second modifying, excluding a second feature, values of the features in second imperfect copies of original tuples in the dataset, and excluding, from the features in the dataset, the second feature when an average anomaly probability for the second imperfect copies exceeds a threshold.

19. The one or more non-transitory computer-readable media of claim 11 wherein the dataset is unlabeled.

20. The one or more non-transitory computer-readable media of claim 11 wherein:

said modifying the values in the imperfect copies is a first modifying first imperfect copies;

said anomaly scores for the original tuples are anomaly probabilities;

the instructions further cause second modifying, for each feature not in a second subset of features, values of the features in second imperfect copies of original tuples in the dataset;

said generating the explanation excludes, based on the average anomaly probability for the second imperfect copies, the second subset of features.

* * * * *

UNITED STATES PATENT AND TRADEMARK OFFICE
CERTIFICATE OF CORRECTION

PATENT NO. : 11,966,275 B2
APPLICATION NO. : 17/992743
DATED : April 23, 2024
INVENTOR(S) : Seyfi et al.

It is certified that error appears in the above-identified patent and that said Letters Patent is hereby corrected as shown below:

On the Title Page

On page 2, Column 1, under item (56) Other Publications, Line 2, delete "dwnloaded" and insert -- downloaded --, therefor.

On page 2, Column 1, under item (56) Other Publications, Line 17, delete "Interpretablity"," and insert -- Interpretability", --, therefor.

On page 2, Column 2, under item (56) Other Publications, Line 2, delete "dwnloaded" and insert -- downloaded --, therefor.

On page 2, Column 2, under item (56) Other Publications, Line 5, delete "dwnloaded" and insert -- downloaded --, therefor.

On page 2, Column 2, under item (56) Other Publications, Line 36, delete "wth" and insert -- with --, therefor.

In the Specification

In Column 5, Line 45, delete "explanation" and insert -- explanation. --, therefor.

In Column 11, Line 63, delete "reamining" and insert -- remaining --, therefor.

In Column 15, Line 8, delete "infromation" and insert -- information --, therefor.

In Column 15, Line 14, delete "contatining" and insert -- containing --, therefor.

In Column 15, Lines 33-34, delete "group s," and insert -- groups, --, therefor.

In Column 15, Line 35-36, delete "importan ces" and insert -- importances --, therefor.

Signed and Sealed this
Thirteenth Day of August, 2024

Katherine Kelly Vidal
*Director of the United States Patent and Trademark Office*

CERTIFICATE OF CORRECTION (continued)
U.S. Pat. No. 11,966,275 B2

In Column 15, Line 41, delete "groupto" and insert -- group to --, therefor.

In Column 15, Line 42-43, delete "predict ed" and insert -- predicted --, therefor.

In Column 15, Line 51-52, delete "fea ture" and insert -- feature --, therefor.

In Column 15, Line 58-59, delete "gr oup," and insert -- group, --, therefor.

In Column 18, Line 38, delete "coalition" and insert -- coalition. --, therefor.

In Column 27, Line 52, delete "and or" and insert --- and/or --, therefor.